United States Patent
Li et al.

(10) Patent No.: US 10,025,930 B2
(45) Date of Patent: Jul. 17, 2018

(54) HARDWARE ASSISTED BRANCH TRANSFER SELF-CHECK MECHANISM

(71) Applicant: McAfee, LLC, Plano, TX (US)

(72) Inventors: Xiaoning Li, Hillsboro, OR (US); Lixin Lu, San Jose, CA (US); Ravi Sahita, Portland, OR (US)

(73) Assignee: McAfee, LLC, Plano, TX (US)

( * ) Notice: Subject to any disclaimer, the term of this patent is extended or adjusted under 35 U.S.C. 154(b) by 179 days.

(21) Appl. No.: 14/998,155

(22) Filed: Dec. 24, 2015

(65) Prior Publication Data
US 2017/0185777 A1   Jun. 29, 2017

(51) Int. Cl.
*G06F 21/56* (2013.01)

(52) U.S. Cl.
CPC .......... *G06F 21/566* (2013.01); *G06F 21/567* (2013.01); *G06F 2221/034* (2013.01)

(58) Field of Classification Search
CPC . G06F 21/566; G06F 21/567; G06F 2221/034
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 9,171,159 B2 | 10/2015 | Shanmugavelayutham et al. | |
| 9,405,570 B2 | 8/2016 | Sahita et al. | |
| 9,626,508 B2 | 4/2017 | Sahita et al. | |
| 2010/0011209 A1 | 1/2010 | Kiriansky et al. | |
| 2010/0064367 A1* | 3/2010 | Lysemose Hansen .. | G06F 21/54 726/23 |
| 2011/0231510 A1 | 9/2011 | Korsunsky et al. | |
| 2012/0255000 A1* | 10/2012 | Sallam .................. | G06F 21/566 726/23 |
| 2013/0117743 A1 | 5/2013 | Neiger et al. | |
| 2014/0013326 A1 | 1/2014 | Neiger et al. | |
| 2015/0067763 A1 | 3/2015 | Dalcher et al. | |
| 2015/0121366 A1 | 4/2015 | Neiger et al. | |
| 2015/0161383 A1 | 6/2015 | Chen et al. | |

FOREIGN PATENT DOCUMENTS

KR  1020070094824 A  9/2007
WO     2017112272 A1  6/2017

OTHER PUBLICATIONS

International Search Report and Written Opinion in International Application No. PCT/US2016/063438, dated Mar. 9, 2017, 14 pages.

* cited by examiner

*Primary Examiner* — Mohammed Waliullah
(74) *Attorney, Agent, or Firm* — Patent Capital Group

(57) ABSTRACT

Embodiments of the present disclosure are directed to a self-check application to determine whether an indirect branch execution is permissible for an executable application. The self-check application uses one or more parameters received from an execution profiling module to determine whether the indirect branch execution is permitted by one or more self-check policies.

5 Claims, 8 Drawing Sheets

HARDWARE ASSISTED BRANCH TRANSFER SELF-CHECK MECHANISM

TECHNICAL FIELD

This disclosure pertains to computer security, and more particularly to hardware assisted branch transfer self-check mechanisms.

BACKGROUND

Vulnerabilities exist in software and become key threats for attack to leverage exploit techniques to successfully deliver attack. In a real advanced persistent attack, unknown vulnerabilities and exploits are utilized frequently to bypass existing security solutions. Return Oriented Programming (ROP) is one kind of exploit techniques to bypass data execution prevention. Just-in-time (JIT) spraying is another example that how exploit techniques can bypass existing defense solutions.

Often, malicious code triggers vulnerability first, then causes unexpected control flow transfer afterwards. Exploit mitigation solutions existed for many years including host intrusion prevention system. Most of them focus on in/post exploit detection because there is no effective way to catch first trigger point without hardware assist. Once exploit targets the correct trigger point, it could bypass existing protection solutions.

DETAILED DESCRIPTION

Figure 1:
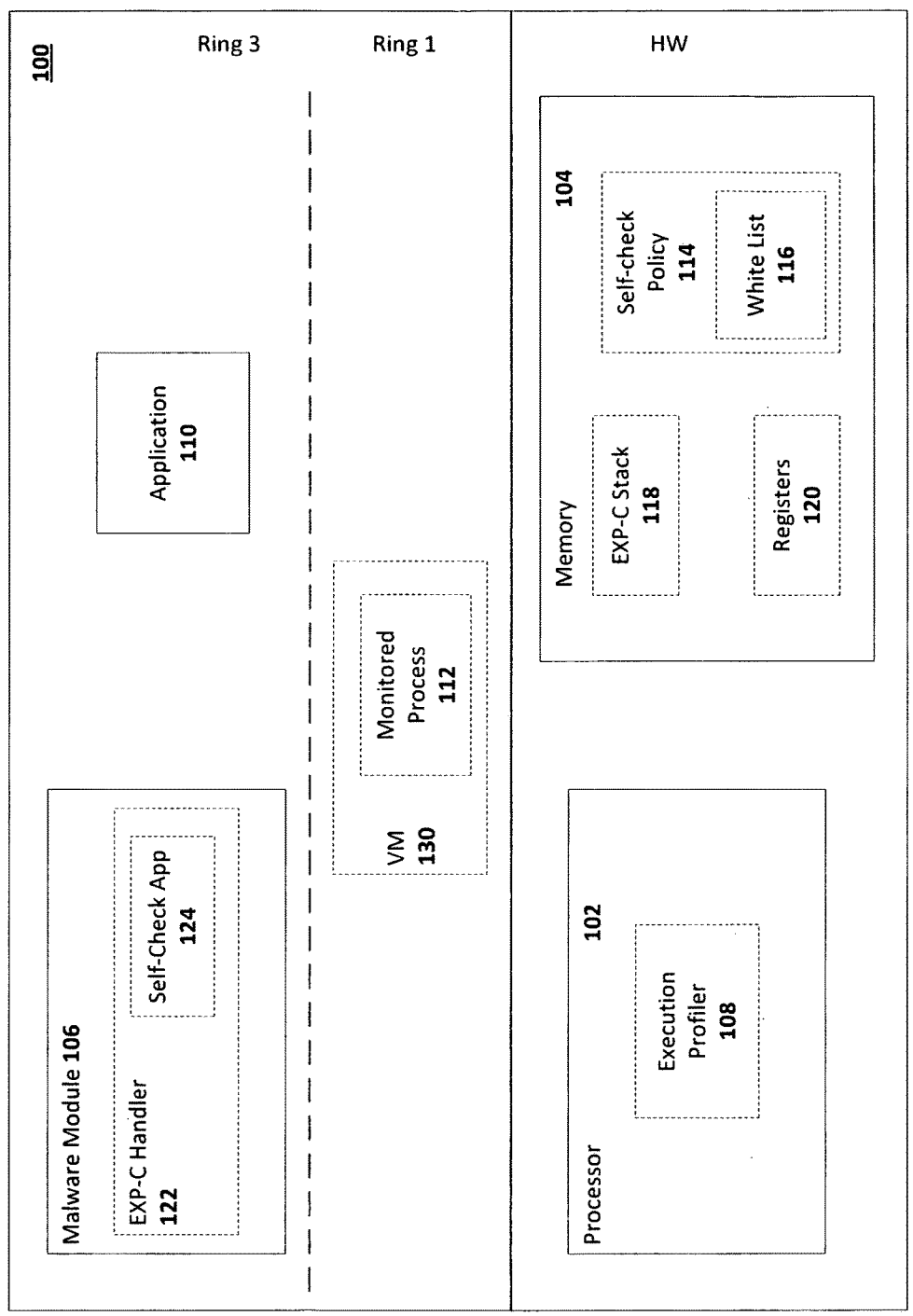
FIG. 1 is a schematic block diagram of an example computer system for detecting the presence of malware in an event's processing, in accordance with certain embodiments of the present disclosure.

In modern electronic systems, one major issue remains electronic security. A constant threat to the security of an electronic system is the threat of assimilation of system resources through means other than those intended by the user of the system. These means may take the form of software, hardware, firmware, or some combination thereof, and may include computer viruses, worms, spyware, adware, or other means that may gather information from an infected electronic device, corrupt the device, or have some other deleterious effect. These means may be generally referred to as "malware."

One particularly nefarious breed of malware may insert itself into electronic device's event processing routines in order to subvert, monitor, and/or alter these processes. For example, a key-stroke logging software may be inserted into the handling of keystrokes in order to capture these keystrokes. Another type of malware may make use of "return-oriented programming," in which the malware seeks to take advantage of return calls to various stacks and/or registers of the host computer in order to insert malicious code of its own.

Malware may be generally characterized by a need to be inserted into the handling of an event of some sort, even if only to be scheduled for execution by the system. Detecting malware's presence in an event processing is valuable, but often difficult. For example, malware may be included in an event's processing by indirect methods such as taking advantage of a vulnerability of the electronic device itself (an "exploit"). Some prior electronic security software has been able to discover which insertion methods may be used and monitoring these insertion methods (e.g., the known vulnerabilities). For example, in the case of a key-stroke logger, the method of insertion may be an exploit of an application programming interface ("API"). One historic method of dealing with this vulnerability has been to monitor the API in order to detect subversion of the normal operation.

Reactive approaches to detection such as this may make it difficult to keep pace with changes to malware insertion techniques. An improved approach may be one that allows for detection of the presence of malware.

This disclosure describes a no-recompile approach to insert control-flow guard-like policies into software. The disclosure allows a software vendor to insert and update the policies for shepherding control flows without requiring modifications to the existing tools such as compilers, linkers, and late loaders (which insert indirect branches that are checked by the self-guarding policies).

The present disclosure makes use of execution profiling feature (EXP-C) to guarantee that a function call via an indirect branch will activate a self-check application framework. An example of EXP-C can be found at U.S. patent Ser. No. 14/129,246 filed on Aug. 28, 2013. The self-check application can register a self-check handler into the callback framework which will get invoked before every critical function calls/returns and deregister self-check handler after every critical function calls/returns. In the registered self-check handler, application can accurately inspect the branch transfer because the branch transfer event will trigger self-check handler on-the-fly. This approach can involve application knowledge to provide fine grant access control on target branch transfer.

In some embodiments, a software vendor can program a self-check application module into the software that knows how the software should behave given certain parameters, such as hardware parameters, OS parameters, other software parameters, source register addresses, destination register addresses, etc. The self-check application can be invoked by the EXP-C upon detection of an indirect branch call. The self-check application can compare parameters associated with the indirect branch call with self-check policies built into the self-check application framework to determine whether the indirect branch execution is permitted. By building the self-check application framework directly into the software, the vendor can ensure that only permissible indirect branch calls are permitted, thereby avoiding impermissible calls and potentially harmful consequences.

FIG. 1 is a schematic block diagram of an example computer system 100 for detecting the presence of malware in an event's processing, in accordance with certain embodiments of the present disclosure. System 100 may include processor 102, memory 104, malware module 106 communicatively coupled to processor 102, execution profiling module 108 communicatively coupled to processor 102, and an application 110 running a "monitored process" 112. The monitored process 112 is a potentially harmful process that is executed by the application 110. Computer system 100 also include a data processing environment that can be characterized by privileged levels, such as a high privilege level Ring 1 and a lower privileged level Ring 3. Applications 110 and malware module 106 can reside and be executed from the lower privilege level Ring 3. A virtual machine 130 can be run at higher privileged levels to act as a sandboxing environment for executing processes from the application 110, such as monitored process 112.

The processor 102, memory 104, and execution profiling module 108 may be configured to execute on any suitable portion of system 100. The system 100 may include, for example, a server, computer, node, gateway, router, transmitter, or receiver. System 100 may be implemented by any suitable electronic device and/or combination of electronic devices, such as: computer(s), laptop(s), cloud computing server(s), blade(s), desktop(s), rack server(s), mobile device(s), and/or web server(s). In some embodiments, system 100 may be implemented by one or more microprocessor(s), microcontroller(s), application-specific integrated circuit(s), and/or other appropriate electronic devices in a system on a chip ("SoC") configuration.

In some embodiments, processor 102 may comprise, for example, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104. Memory 104 may be configured in part or whole as application memory, system memory, or both. Memory 104 may include any system, device, or apparatus configured to hold and/or house one or more memory modules. Each memory module may include any system, device or apparatus configured to retain program instructions and/or data for a period of time (e.g., computer-readable storage media). Instructions, logic, or data for configuring the operation of system 100, such as configurations of components may reside in memory 104 for execution by processor 102.

In some embodiments, system 100 may monitor execution of select activities. That is, system 100 may allow for generic runtime detection of unauthorized software. For example, system 100 may allow a user of a system 100 to determine from where a software execution flow originated and to where the execution flow may continue. In the same or alternative embodiments, system 100 may discover code involved in the handling of a traced event. For example, system 100 may discover code involved in the handling of an input-output ("I/O") event, the return from invocation of a privileged API, etc.

In some embodiments, system 100 may be configured to detect unauthorized software without the use of signatures, plugging, monitoring individual known exploits, and/or other methods of identifying malicious software based on prior knowledge of the behavior of unauthorized software. That is, system 100 may be configured to detect previously unknown versions of a piece of unauthorized software, and/or may not require frequent updating of monitoring software in response to changes to system software.

In some embodiments, system 100 may include malware module 106. Malware module 106 may be configured to monitor execution of select activities. Malware module 106 may be configured to receive output from execution profiling module 108 to detect unauthorized software. For example, malware module 106 may be an agent executing on system 100 configured to apply security policies to data gleaned regarding the execution profiles of identified events.

In some embodiments, system 100 may include execution profiling module 108. Execution profiling module 108 may be configured to implement and provide execution profiling and monitoring capability. In some embodiments, execution profiling module 108 may be implemented through hardware, software, and/or some combination thereof. For example, execution profiling module 108 may be implemented through the use of Binary Translation techniques (or other appropriate code emulation techniques) and/or CPU hardware extensions developed for use with execution profiling module 108. As an example of the latter, CPU extensions may be developed based on branch trapping.

The execution profiler 108 can communicate with an EXP-C handler 122. EXP-C handler 122 can be used to apply self-check policies for the specific application and for the critical function call that is being monitored. The EXP-C handler 122 can also be referred to as a self-check handler.

The execution profiler 108 can be in communication with memory 104; specifically, the execution profiler 108 receives model specific register instructions from the registers 120. The execution profiler can also store information on the EXP-C stack 118.

In some embodiments, execution profiling module 108 may be configured to inform or notify the malware module 106 of critical function calls so that the malware module 106 can invoke callbacks based on a self-check policy 114. For example, execution profiling module 108 may notify the malware module 106 when an event to be traced is identified and/or generated. The malware module 106, using the self-check application 124, can enable generation of callbacks when certain branch instructions execute (any appropriate code segment that may depend on and/or alter an execution flow at a particular point, e.g., CALL, JMP, RET); generate callbacks through binary translation (software-based and/or hardware-assisted), existing CPU Debug Break on Branch, and/or other CPU extensions; filter callbacks by an identifier (e.g., a software process ID) associated with a process and/or thread executing an instruction, wherein the identifier may be determined by an examination of CPU register contents; identify code involved in a branch (pre- and/or post-branch) while handling callbacks; check identified code for validity (e.g., a signature check, a scan for malware); check identified code for desirability (or necessity) of its inclusion in handling the traced event; and/or check for use of return-oriented programming techniques. In the same or alternative embodiments, execution profiling module 108 may be further configured, when checking for the use of return-oriented programming techniques, to examine the call stack at a point of branch to verify whether it is legitimate or induced by return-oriented programming. An example of the ways by which this examination may be performed may be found in U.S. Pat. No. 7,987,451.

In the same or alternative embodiments, execution profiling module 108 may be configured notify malware module 106 to perform checks when other criteria are met. For example, callbacks may be invoked upon indirect branch detection, manipulation of return addresses already present in the call stack (e.g., overwriting return addresses placed in the stack legitimately), and/or other forms of illegitimate manipulation of call frames and/or call frame data. In some embodiments, these checks may be coupled with identification and examination of code at a destination of a new return address and/or a check of the legitimacy of identified code.

In some embodiments, malware module 106 may be implemented as either a high-level and/or a low-level module, depending on the performance needs of a given implementation. For example, malware module 106 (and/or execution profiling module 108) may be implemented as hardware, software stored on computer-readable media, firmware, and/or some combination thereof, either as stand-alone modules and/or integrated into other parts of system 100.

In operation, system 100 may operate to detect unauthorized software based on execution profiles rather than signatures or other static pattern matching. That is, system 100 may identify unauthorized software based on behavioral and/or runtime solutions. An approach based on execution profiling may avoid some of the disadvantages associated with other techniques. For example, unlike host intrusion prevention systems (and other behavioral approaches) that rely on API usage heuristics, execution profiling may be less susceptible to return-oriented programming attacks, hook skipping, hook tempering, etc. Execution profiling may, for example, address such attacks on a zero-day basis without requiring expensive hooking approaches. As an additional example, other types of malware identification systems may employ software fault isolation to de-privilege untrusted processes from performing certain types of system operations. However, this type of approach may not be effective on attacks on trusted and/or privileged code. In order to address these and other concerns, execution profiling may identify unauthorized software without prior knowledge or discovery of target code addresses; rather, these may be discovered during the monitoring of execution flow.

System 100 also includes a self-check application 124. Self-check application 124 can receive self-check policy information 114 stored in memory. Self-check policy information can include a white list 116 of allowable execution instructions and register locations. The self-check policy 114 can be used by the self-check application 124 to prevent an undesirable indirect branch execution.

Figure 2:
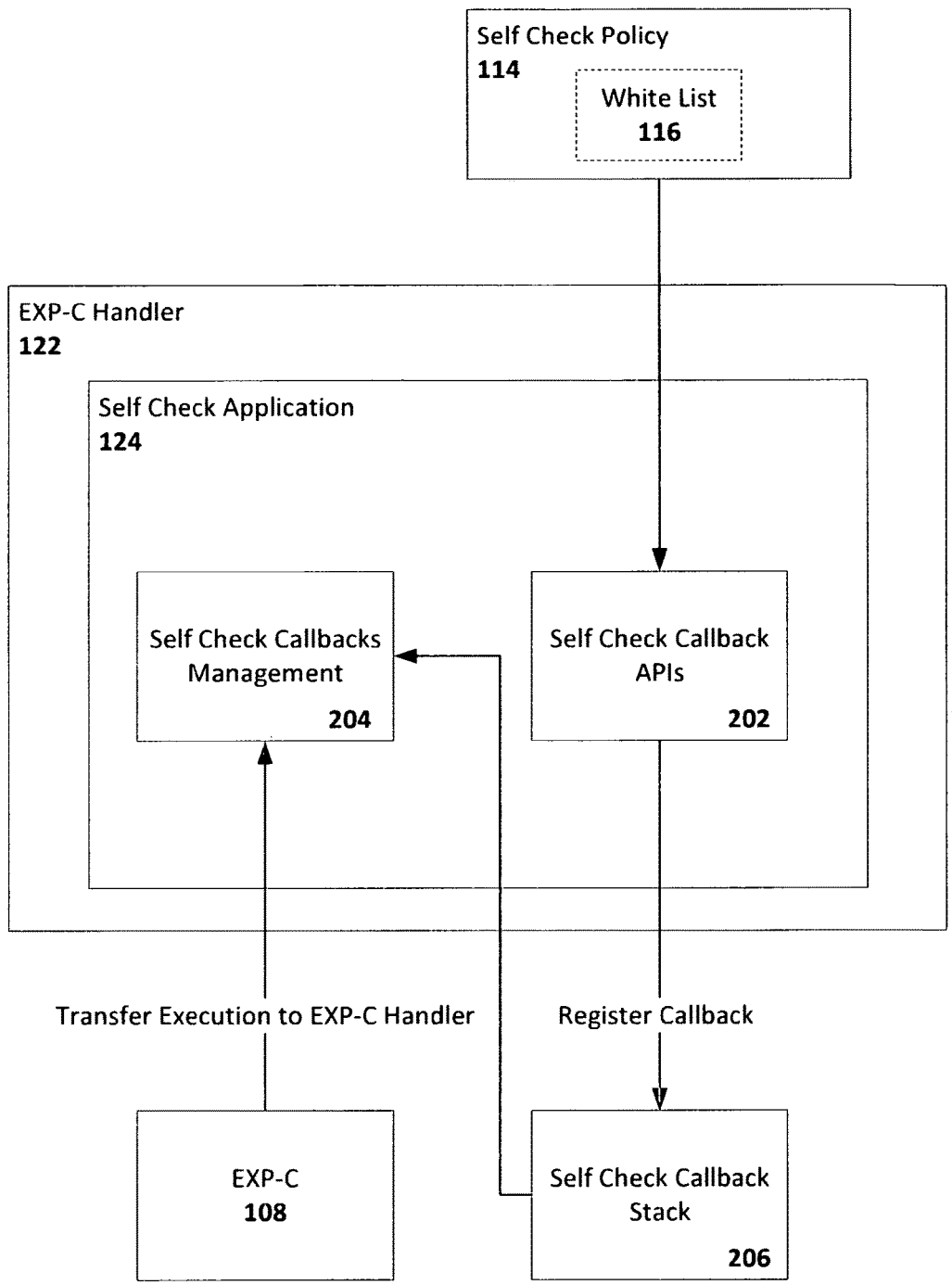
FIG. 2 is a schematic block diagram for a self-check application framework in accordance with embodiments of the present disclosure.

FIG. 2 is a schematic block diagram for a self-check application framework 200 in accordance with embodiments of the present disclosure. With the execution profiling mechanism 108 active, as described in FIG. 1, the self-check application framework 200 includes a self-check policy callback API 202, a self-check callback manager 204, and a self-check callback stack 206.

The self-check policy callback API 202 is used to register and/or deregister the self-check application for owned callbacks during executable application indirect branch calls or critical calls. The self-check callback manager 204 receives a notification from the EXP-C 108 (e.g., as an indirect branch event) and invokes the registered self-check callback from the stack 206 when an indirect branch is detected. The self-check callback stack 206 maintains a callback stack, which keeps all registered callbacks (e.g., registered by the self-check policy callback API 202), including default callbacks defined by EXP-C framework without application knowledge.

The self-check callback is an policy callback owned by the application 110 that is running the monitored process 112 (from FIG. 1). The self-check policy 114 is provided to the self-check callback API by the application or by a developer or user. The self-check policy 114 can include a set of authorized or permitted memory address spaces. In some cases, the self-check policy 114 can include a whitelist 116 of authorized memory address spaces for critical function calls or indirect branch calls. In the owned policy callback, the application knows how critical function calls exactly happen and it can define very accurate policy check to block any unexpected branch transfer.

Figure 3A:
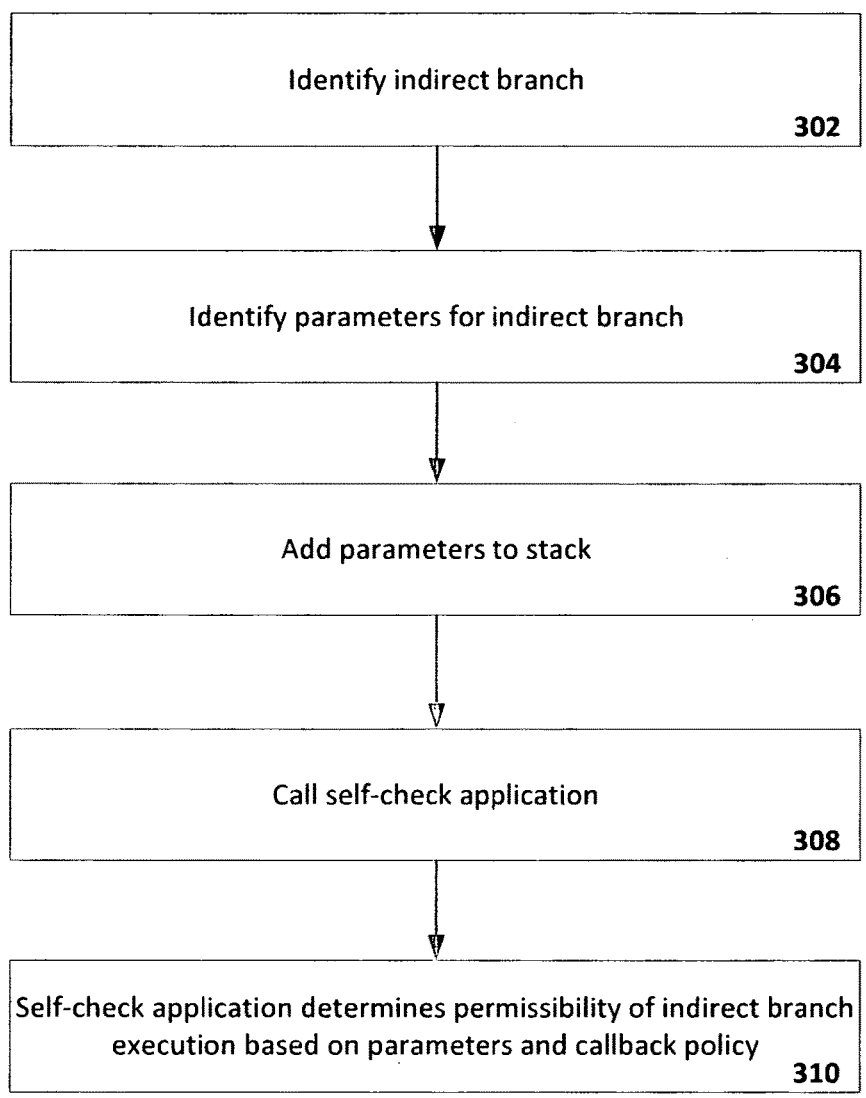
FIG. 3A is a process flow diagram for evaluating an indirect branch execution based on a self-check of policies in accordance with embodiments of the present disclosure.

FIG. 3A is a process flow diagram 300 for evaluating an indirect branch execution based on a self-check of policies in accordance with embodiments of the present disclosure. An execution profiling module can detect an indirect branch call as it profiles the execution of an executable application (302). The execution profiler module may, for example, identify call register instruction, which if executed would instruct a register access based on one or more parameters from the indirect instruction. An indirect branch can include a computed jump, an indirect jump, a register-indirect jump, an indirect call, etc. An indirect branch specifies where in memory the address is located for the next instruction to be executed.

The execution profiler module can identify one or more parameters associated with executing the indirect branch (304). For example, the execution profiler module can identify hardware parameters, software parameters, source register addresses, destination register addresses, type of indirect branch, position in the executable application, contextual cues, etc., for executing the indirect branch. The execution profiler module can place the parameter information onto the EXP-C software stack (306).

The execution profile module can call the self-check application upon detecting the indirect branch (308). The self-check application can evaluate the parameters and the indirect branch to determine whether execution of the indirect branch instructions is permissible (310). For example, the self-check application can use a source register address and a destination register address to determine whether the source register address is a permissible invocation point for the destination register address for a certain execution point. The self-check application can use a self-check policy, that may include a whitelist of permissible or valid parameters for the indirect branch instruction execution.

If the self-check application determines that there is an impermissible indirect branch execution, the executable application can skip that instruction set and continue. By skipping the instruction set, the impermissible instruction is not executed and the executable application can continue to run. Other impermissible instructions sets would likewise be skipped until the executable application terminates. In addition, the self-check application can log the impermissible instructions. In some cases, the self-check application can terminate the entire executable application.

Figure 3B:
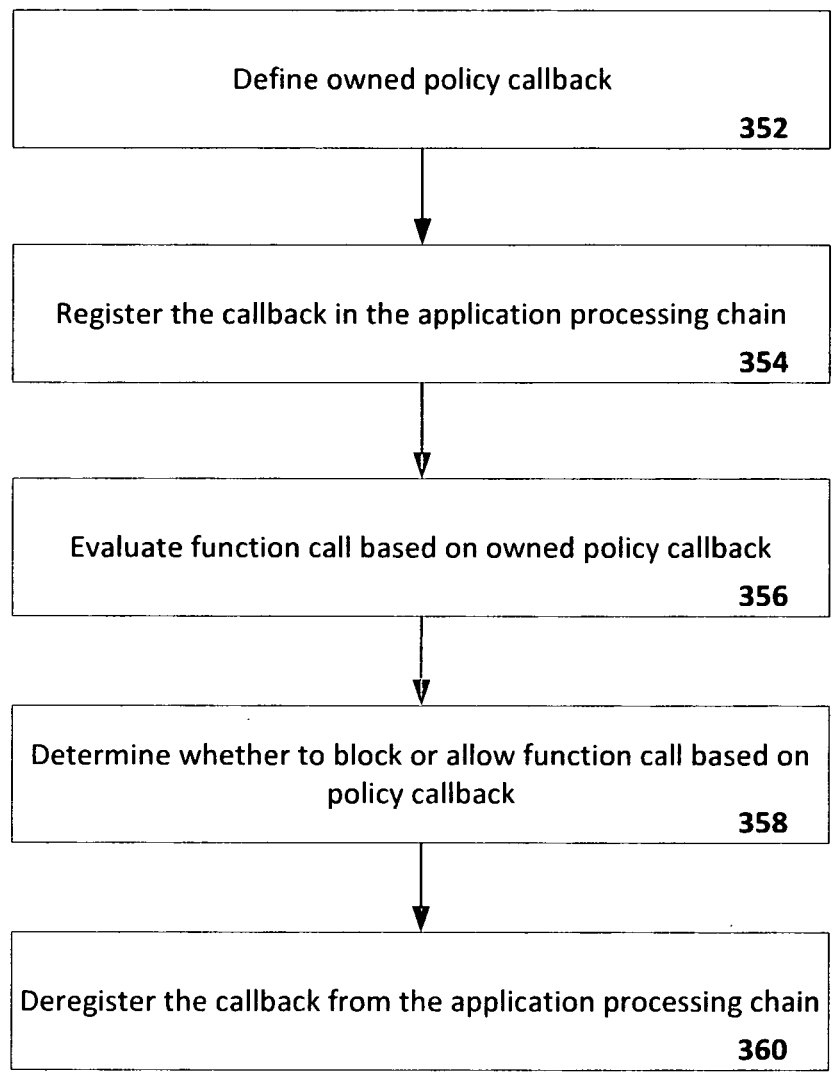
FIG. 3B is a process flow diagram for registering a self-check callback in accordance with embodiments of the present disclosure.

FIG. 3B is a process flow diagram 350 for registering a self-check callback in accordance with embodiments of the present disclosure. To use self-check APIs correctly, the self-check application first defines owned policy callbacks (352). Before indirect branches are called, the self-check application registers owned callback before calling into critical functions (354). The self-check application can evaluate the indirect branch based on the owned policy callback (356). The self-check application can determine whether to block or allow the function call based on the policy callback (358). After function calls, the callback can be deregistered (360). In the owned policy callback, the self-check application knows how critical function calls exactly happen with information from EXP-C, the parameters, and/or the policies built into the self-check application framework. The self-check application can define very accurate policy check (e.g., register level accuracy) to block any unexpected branch transfers.

Figure 5:
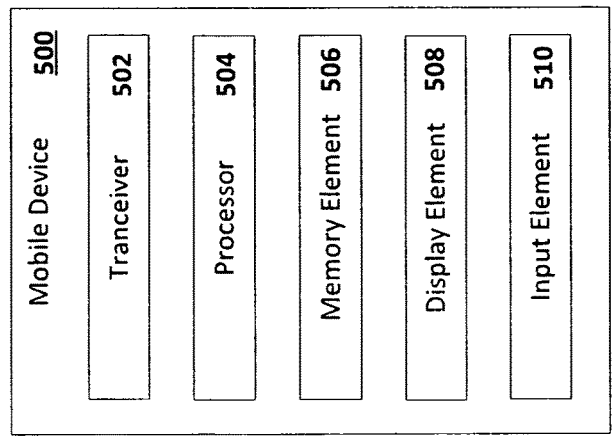
FIG. 5 is a schematic block diagram of a mobile device in accordance with embodiments of the present disclosure.
Figure 4:
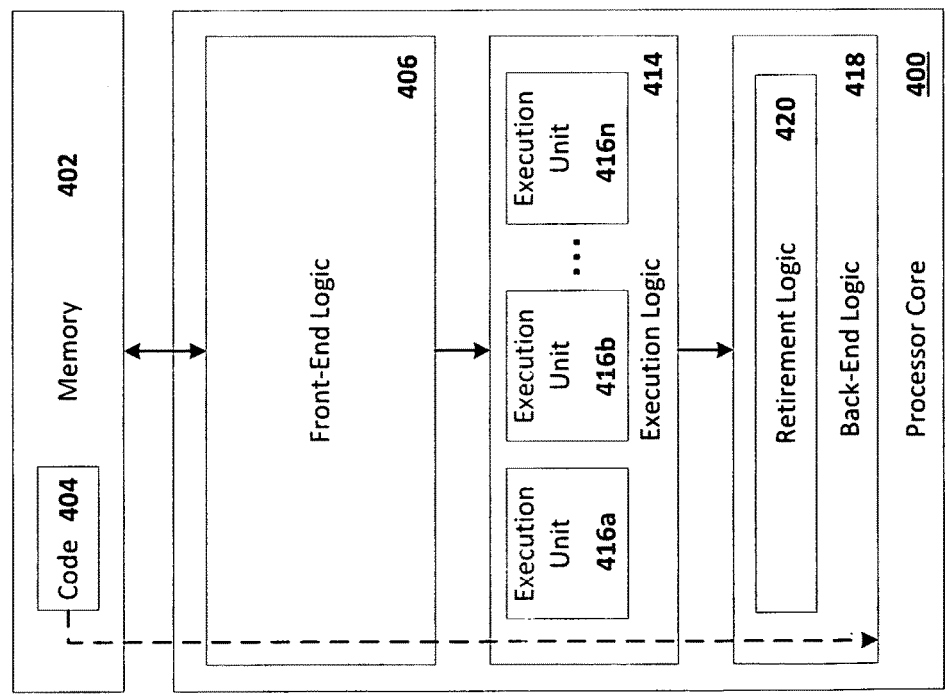
FIG. 4 is an example illustration of a processor according to an embodiment of the present disclosure.
Figure 6:
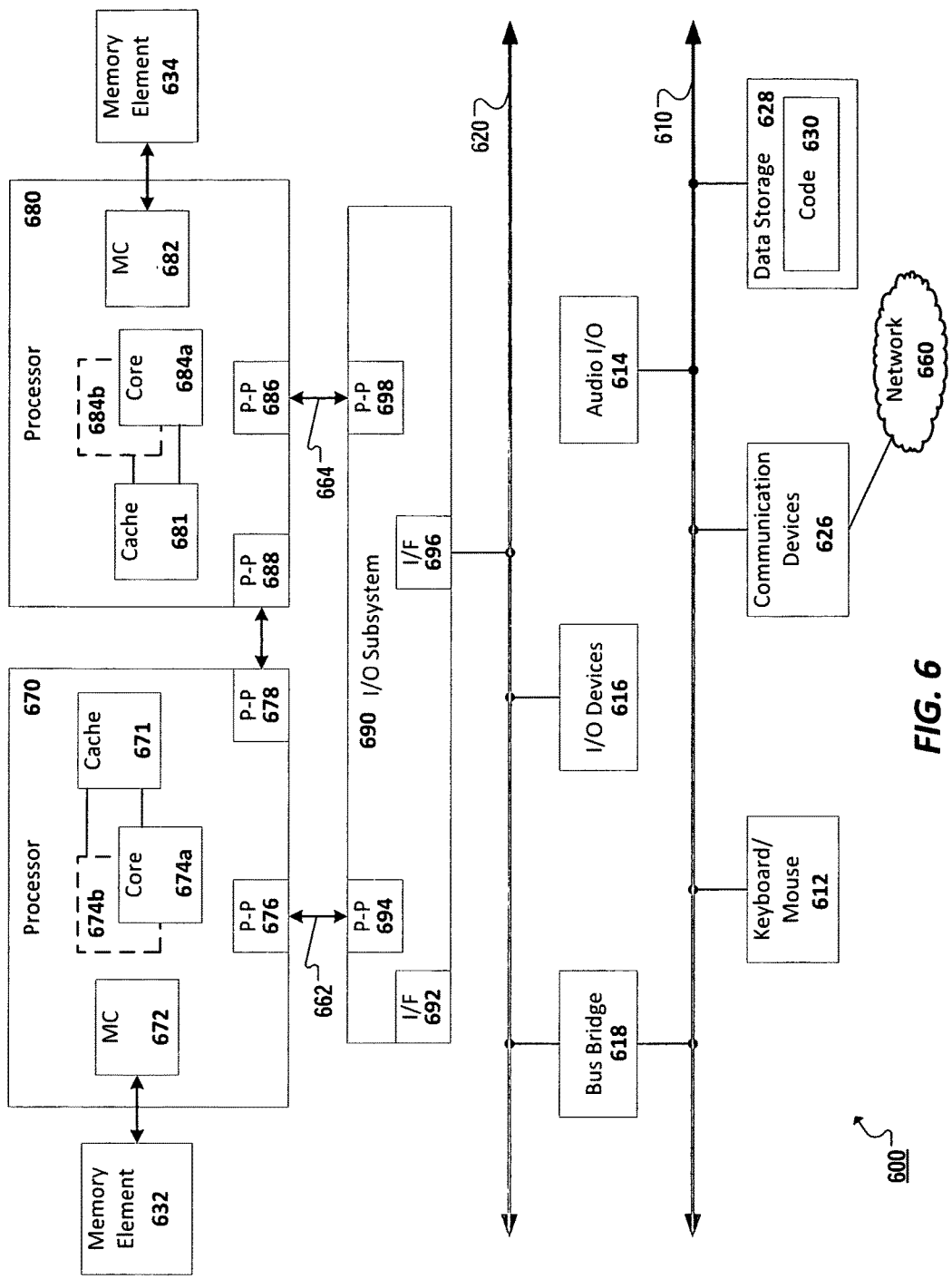
FIG. 6 is a schematic block diagram of a computing system according to an embodiment of the present disclosure.

FIGS. 4-6 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 4-6.

FIG. 4 is an example illustration of a processor according to an embodiment. Processor 400 is an example of a type of hardware device that can be used in connection with the implementations above.

Processor 400 may be any type of processor, such as a microprocessor, an embedded processor, a digital signal processor (DSP), a network processor, a multi-core processor, a single core processor, or other device to execute code. Although only one processor 400 is illustrated in FIG. 4, a processing element may alternatively include more than one of processor 400 illustrated in FIG. 4. Processor 400 may be a single-threaded core or, for at least one embodiment, the processor 400 may be multi-threaded in that it may include more than one hardware thread context (or "logical processor") per core.

FIG. 4 also illustrates a memory 402 coupled to processor 400 in accordance with an embodiment. Memory 402 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 400 can execute any type of instructions associated with algorithms, processes, or operations detailed herein. Generally, processor 400 can transform an element or an article (e.g., data) from one state or thing to another state or thing.

Code 404, which may be one or more instructions to be executed by processor 400, may be stored in memory 402, or may be stored in software, hardware, firmware, or any suitable combination thereof, or in any other internal or external component, device, element, or object where appropriate and based on particular needs. In one example, processor 400 can follow a program sequence of instructions indicated by code 404. Each instruction enters a front-end logic 406 and is processed by one or more decoders 408. The decoder may generate, as its output, a micro operation such as a fixed width micro operation in a predefined format, or may generate other instructions, microinstructions, or control signals that reflect the original code instruction. Front-end logic 406 also includes register renaming logic 410 and scheduling logic 412, which generally allocate resources and queue the operation corresponding to the instruction for execution.

Processor 400 can also include execution logic 414 having a set of execution units 416a, 416b, 416n, etc. Some embodiments may include a number of execution units dedicated to specific functions or sets of functions. Other embodiments may include only one execution unit or one execution unit that can perform a particular function. Execution logic 414 performs the operations specified by code instructions.

After completion of execution of the operations specified by the code instructions, back-end logic 418 can retire the instructions of code 404. In one embodiment, processor 400 allows out of order execution but requires in order retirement of instructions. Retirement logic 420 may take a variety of known forms (e.g., re-order buffers or the like). In this manner, processor 400 is transformed during execution of code 404, at least in terms of the output generated by the decoder, hardware registers and tables utilized by register renaming logic 410, and any registers (not shown) modified by execution logic 414.

Although not shown in FIG. 4, a processing element may include other elements on a chip with processor 400. For example, a processing element may include memory control logic along with processor 400. The processing element may include I/O control logic and/or may include I/O control logic integrated with memory control logic. The processing element may also include one or more caches. In some embodiments, non-volatile memory (such as flash memory or fuses) may also be included on the chip with processor 400.

Referring now to FIG. 5, a block diagram is illustrated of an example mobile device 500. Mobile device 500 is an example of a possible computing system (e.g., a host or endpoint device) of the examples and implementations described herein. In an embodiment, mobile device 500 operates as a transmitter and a receiver of wireless communications signals. Specifically, in one example, mobile device 500 may be capable of both transmitting and receiving cellular network voice and data mobile services. Mobile services include such functionality as full Internet access, downloadable and streaming video content, as well as voice telephone communications.

Mobile device 500 may correspond to a conventional wireless or cellular portable telephone, such as a handset that is capable of receiving "3G", or "third generation" cellular services. In another example, mobile device 500 may be capable of transmitting and receiving "4G" mobile services as well, or any other mobile service.

Examples of devices that can correspond to mobile device 500 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 500 illustrated in FIG. 5 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 500 includes a transceiver 502, which is connected to and in communication with an antenna. Transceiver 502 may be a radio frequency transceiver. Also, wireless signals may be transmitted and received via transceiver 502. Transceiver 502 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 502 is connected to a processor 504, which may perform the bulk of the digital signal processing of signals to be communicated and signals received, at the baseband frequency. Processor 504 can provide a graphics interface to a display element 508, for the display of text, graphics, and video to a user, as well as an input element 510 for accepting inputs from users, such as a touchpad, keypad, roller mouse, and other examples. Processor 504 may include an embodiment such as shown and described with reference to processor 400 of FIG. 4.

In an aspect of this disclosure, processor 504 may be a processor that can execute any type of instructions to achieve the functionality and operations as detailed herein. Processor 504 may also be coupled to a memory element 506 for storing information and data used in operations performed using the processor 504. Additional details of an example processor 504 and memory element 506 are subsequently described herein. In an example embodiment, mobile device 500 may be designed with a system-on-a-chip (SoC) architecture, which integrates many or all components of the mobile device into a single chip, in at least some embodiments.

FIG. 6 is a schematic block diagram of a computing system 600 according to an embodiment. In particular, FIG. 6 shows a system where processors, memory, and input/output devices are interconnected by a number of point-to-point interfaces. Generally, one or more of the computing systems described herein may be configured in the same or similar manner as computing system 600.

Processors 670 and 680 may also each include integrated memory controller logic (MC) 672 and 682 to communicate with memory elements 632 and 634. In alternative embodiments, memory controller logic 672 and 682 may be discrete logic separate from processors 670 and 680. Memory elements 632 and/or 634 may store various data to be used by processors 670 and 680 in achieving operations and functionality outlined herein.

Processors 670 and 680 may be any type of processor, such as those discussed in connection with other figures. Processors 670 and 680 may exchange data via a point-to-point (PtP) interface 650 using point-to-point interface circuits 678 and 688, respectively. Processors 670 and 680 may each exchange data with a chipset 690 via individual point-to-point interfaces 652 and 654 using point-to-point interface circuits 676, 686, 694, and 698. Chipset 690 may also exchange data with a high-performance graphics circuit 638 via a high-performance graphics interface 639, using an interface circuit 692, which could be a PtP interface circuit. In alternative embodiments, any or all of the PtP links illustrated in FIG. 6 could be implemented as a multi-drop bus rather than a PtP link.

Chipset 690 may be in communication with a bus 620 via an interface circuit 696. Bus 620 may have one or more devices that communicate over it, such as a bus bridge 618 and I/O devices 616. Via a bus 610, bus bridge 618 may be in communication with other devices such as a keyboard/mouse 612 (or other input devices such as a touch screen, trackball, etc.), communication devices 626 (such as modems, network interface devices, or other types of communication devices that may communicate through a computer network 660), audio I/O devices 614, and/or a data storage device 628. Data storage device 628 may store code 630, which may be executed by processors 670 and/or 680.

In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration capable of achieving the functionality and features of examples and implementations provided herein.

Figure 7:
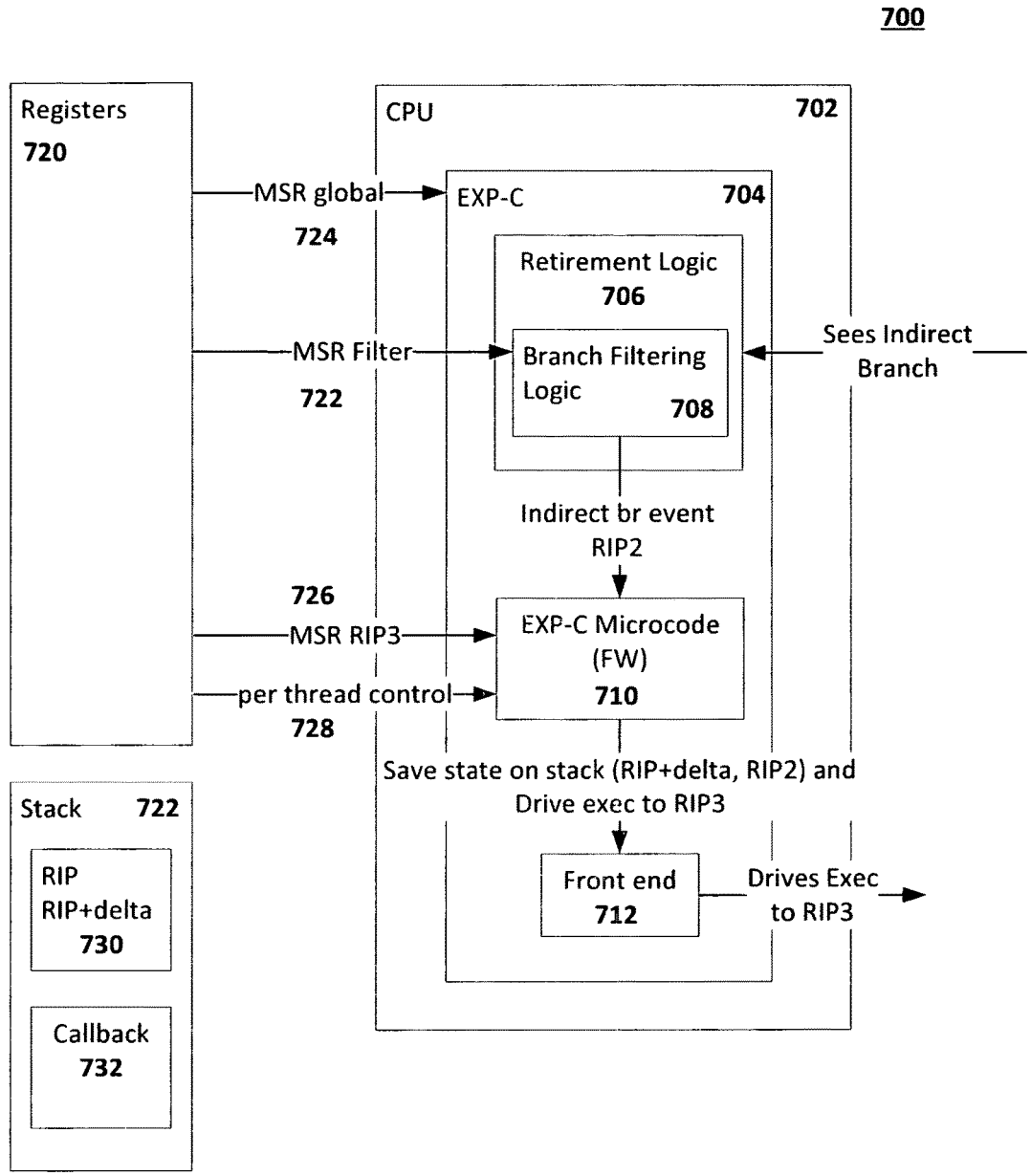
FIG. 7 is a schematic block diagram of an example hardware implementation of execution profiling in accordance with embodiments of this disclosure.

FIG. 7 is a schematic block diagram of an example hardware implementation of execution profiling in accordance with embodiments of this disclosure. FIG. 7 includes an EXP-C implementation scenario 700. EXP-C implementation scenario includes a processor 702 and a set of registers 720. The CPU includes an EXP-C logic 704 implemented at least partially in hardware. EXP-C logic 704 includes retirement logic 706, which uses branch filtering logic 708. EXP-C logic 704 also includes EXP-C microcode (firmware), though in some implementations, the EXP-C can work entirely in hardware. The CPU also includes a front end 712.

The EXP-C 704 can be enabled by a model specific register (MSR) global input from the registers set 720. The MSR global 275 input enables the EXP-C functionality in the CPU 702.

Figure 8A:
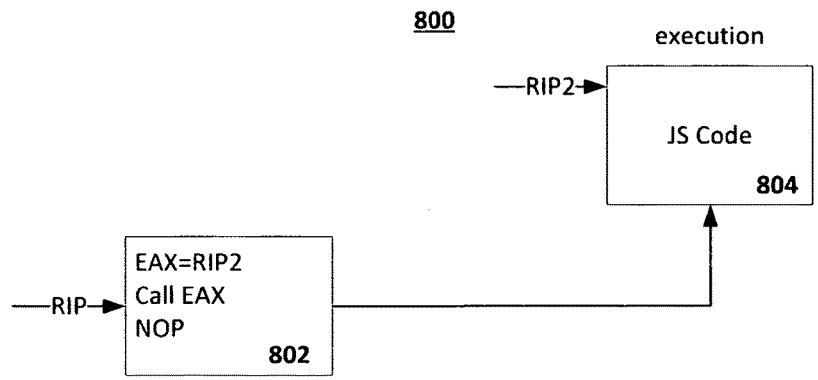
FIGS. 8A and 8B are schematic block diagrams of an example software implementation of execution profiling in accordance with embodiments of this disclosure.
Figure 8B:
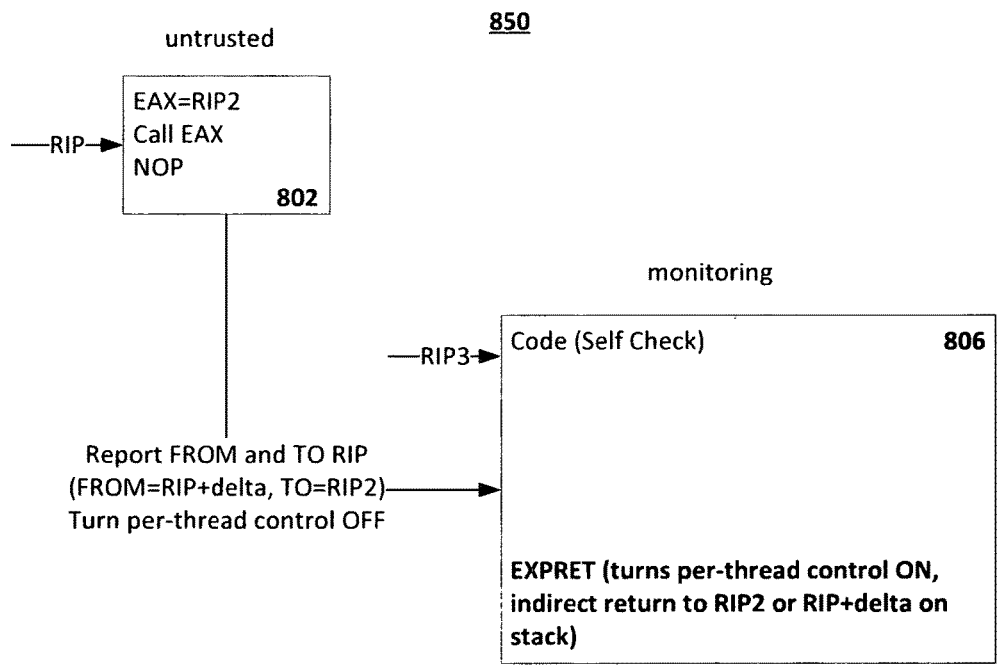

FIGS. 8A and 8B are schematic block diagrams of an example software implementation of execution profiling in accordance with embodiments of this disclosure. FIGS. 7 and 8A and 8B are discussed together.

For context, FIG. 8A shows a branch instruction 802 with an instruction pointer RIP pointing to the branch instruction and an instruction pointer RIP2 pointing to the memory location for executing the next code instruction. When EXP-C is inactive, the branch instruction is executed normally (804), and the instruction pointer RIP2 points to the new memory location for executing the code instruction.

In FIG. 8B, EXP-C is activated (prior to executing the branch instruction 802). The indirect branch 802 is identified, which includes the indirect branch (Call EAX) and the location of the indirect branch instruction (EAX=RIP2).

Turning briefly to FIG. 7, the retirement logic 706 is informed of executed operation, such as the indirect branch call 802. The branch filter logic 708 can be programmed with necessary information for identifying indirect branch calls. For example a model specific register (MSR) filter 722 can be used by the branch filtering logic 708 to provide filtering criteria necessary for the branch filtering logic 708 to types distinguish between different of calls (e.g., far indirect branches, near indirect branches, unconditional indirect jumps, far indirect jumps, near indirect returns, etc.). In the context of FIG. 8B, the branch filtering logic 708 creates an indirect branch event in the EXP-C and provides the EXP-C microcode with RIP2 address of the indirect branch. The RIP2 information comes in from the retirement logic 706 from the indirect branch execution. The EXP-C microcode 710 can then instruct the CPU frontend to drive execution of the indirect branch to another register address, RIP3 in this case.

The EXP-C microcode receives the RIP3 address from the registers set 720, which is a register address for executing code by the malware handler. Additionally, the instruction pointer state information is stored on the stack (here, RIP+delta and RIP2 are stored on the stack). The CPU front end 712 then drives execution of the indirect branch to RIP3. The malware handler can then inject code into the RIP3 address space for execution.

Returning to FIG. 8B, the RIP3 points to the address space for the malware handler execution. After the malware handler runs, the EXPRET can run. EXPRET turns on per-thread control (which was turned off prior to running malware handler). The EXPRET then performs an indirect branch to the RIP2 (to execute the original indirect branch) or returns to RIP+delta, which is the next instruction after the EAX (in this case, the NOP in 802).

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

Example 1 is a computer program product tangibly embodied on non-transient computer readable media, the computer program product comprising instructions operable when executed to receive, from an execution profiler implemented at least partially in hardware, execution control of an indirect branch for a function call in an executable application; execute a callback to a self-check policy associated with the executable application for the indirect branch; and determine, by a self-check application module implemented at least partially in hardware, whether to execute the indirect branch based on the self-check policy associated with the executable application.

Example 2 may include the subject matter of example 1, wherein the indirect branch comprises one of a near indirect call, a near indirect jump, or a near return.

Example 3 may include the subject matter of any of examples 1 or 2, wherein the self-check policy comprises a defense to a control-flow attack.

Example 4 may include the subject matter of any of examples 1 or 2 or 3, wherein the self-check policy comprises a white list of authorized memory address locations for the indirect branch.

Example 5 may include the subject matter of any of examples 1 or 2 or 3 or 4, wherein determining whether to execute the indirect branch based on the self-check policy associated with the executable application comprises evaluating one or more parameters for the indirect branch provided to the self-check application module by the execution profiler; and determining whether the one or more parameters are permitted for execution based on the self-check policy.

Example 6 may include the subject matter of 5, wherein the parameter comprises one or both of a source register location from which the indirect call originated or a destination register location for the indirect branch call; and wherein the monitor determines whether the self-check policy permits an indirect branch from the source register to the destination register.

Example 7 may include the subject matter of any of examples 1 or 5 or 6, wherein the self-check policy comprises a white list of allowable indirect branch activity.

Example 8 is a computer program product tangibly embodied on non-transient computer readable media, the computer program product comprising instructions operable when executed to receive, from an execution profiler implemented at least partially in hardware, execution control of an indirect branch for a function call in an executable application; and determine, by a monitor implemented at least partially in hardware, whether to execute the indirect branch based on a self-check policy associated with the executable application.

Example 9 may include the subject matter of example 8, wherein the indirect branch comprises one of a near indirect call, a near indirect jump, or a near return.

Example 10 may include the subject matter of any of examples 8 or 9, wherein the self-check policy comprises a defense to a control-flow attack.

Example 11 may include the subject matter of any of examples 8 or 9 or 10, wherein the self-check policy comprises a white list of authorized interactions for the indirect branch.

Example 12 may include the subject matter of any of examples 8 or 9 or 10 or 11, wherein determining whether to execute the indirect branch based on a self-check policy associated with the executable application comprises evaluating one or more parameters for the indirect branch provided to the handler by the execution profiler; and determines whether the one or more parameters are permitted for execution based on the self-check policy.

Example 13 may include the subject matter of example 12, wherein the parameters comprise one or both of a source register location from which the indirect call originated or a destination register location for the indirect call; and wherein the monitor determines whether the self-check policies permits an indirect branch from the source register to the destination register.

Example 14 may include the subject matter of any of examples 8 or 12 or 13, wherein the self-check policy comprises a white list of allowable indirect branch activity.

Example 15 is a computer program product tangibly embodied on non-transient computer readable media, the computer program product comprising instructions operable when executed to register the owned policy callback into an execution chain of the executable application, the owned policy callback comprising an instruction to redirect execution of the executable application to a self-check handler; implement the owned policy callback upon detection of a critical function call for the executable application; and evaluating the critical function call for malware based on the owned policy callback.

Example 16 may include the subject matter of example 15, and also include deregistering the owned policy callback after evaluating the critical function call.

Example 17 may include the subject matter of any of examples 15 or 16, wherein detecting the critical function call comprises identifying a request for an indirect branch.

Example 18 may include the subject matter of any of examples 15 or 16 or 17, wherein evaluating the critical function call comprises comparing the function call against a self-check policy.

Example 19 may include the subject matter of example 18, wherein the self-check policy comprises a white list of approved function calls.

Example 20 is a system for control flow protection. The system can include a processor implemented at least partially in hardware; a memory; an execution profiler module implemented at least partially in hardware to assemble an execution profile of a executable application execution; monitor the executable application execution for an indirect branch instruction; and identify one or more parameters associated with the indirect branch instruction; and a self-check application module implemented at least partially in hardware to determine whether the indirect branch is permitted by performing a self-check using the parameters identified by the execution profiler module.

Example 21 may include the subject matter of example 20, wherein determining whether to execute the indirect branch based on a self-check policy associated with the executable application comprises evaluating one or more parameters for the indirect branch provided to the handler by the execution profiler; and determines whether the one or more parameters are permitted for execution based on the self-check policy.

Example 22 may include the subject matter of example 20 or 21, wherein the parameters comprise one or both of a source register location from which the indirect call originated or a destination register location for the indirect call; and wherein the self-check application module determines whether the self-check policies permits an indirect branch from the source register to the destination register.

Example 23 a system comprising a processor implemented at least partially in hardware; a memory; and an execution profiler module implemented at least partially in hardware to receive, from an execution profiler implemented at least partially in hardware, execution control of an indirect branch for a function call in an executable application; and determine, by a self-check handler module, whether to execute the indirect branch based on a self-check policy associated with the executable application.

Example 29 may include the subject matter of example 28, wherein the indirect branch comprises one of a near indirect call, a near indirect jump, or a near return.

Example 30 may include the subject matter of example 28, wherein the self-check policy comprises a defense to a control-flow attack.

Example 31 may include the subject matter of example 28, wherein the self-check policy comprises a white list of authorized interactions for the indirect branch.

Example 32 may include the subject matter of example 28, wherein determining whether to execute the indirect branch based on a self-check policy associated with the executable application comprises evaluating one or more parameters for the indirect branch provided to a self-check handler by the execution profiler; and determining whether the one or more parameters are permitted for execution based on the self-check policy.

Example 33 may include the subject matter of example 32, wherein the parameters comprise one or both of a source register location from which the indirect call originated or a destination register location for the indirect call; and wherein the monitor determines whether the self-check policies permits an indirect branch from the source register to the destination register.

Example 34 is a computing device comprising a means for receiving execution control of an indirect branch for a function call in an executable application; and a means for determining whether to execute the indirect branch based on a self-check policy associated with the executable application.

Example 35 may include the subject matter of example 34, wherein the indirect branch comprises one of a near indirect call, a near indirect jump, or a near return.

Example 36 may include the subject matter of example 34, wherein the self-check policy comprises a defense to a control-flow attack.

Example 37 may include the subject matter of example 34, wherein the self-check policy comprises a white list of authorized interactions for the indirect branch.

Example 38 may include the subject matter of example 34, wherein determining whether to execute the indirect branch based on a self-check policy associated with the executable application comprises evaluating one or more parameters for the indirect branch provided to the handler by the execution profiler; and determines whether the one or more parameters are permitted for execution based on the self-check policy.

Example 39 may include the subject matter of example 38, wherein the parameters comprise one or both of a source register location from which the indirect call originated or a destination register location for the indirect call; and wherein the monitor determines whether the self-check policies permits an indirect branch from the source register to the destination register.

Example 40 may include the subject matter of any of examples 34 or 38 or 39, wherein the self-check policy comprises a white list of allowable indirect branch activity.

Example 41 is a computing device comprising a means for defining an owned policy callback for an executable application; a means for registering the owned policy callback into an execution chain of the executable application; a means for implementing the owned policy callback upon detection of a critical function call for the executable application; and a means for evaluating the critical function call for malware based on the owned policy callback.

Example 42 may include the subject matter of example 41, the instructions further operable to deregister the owned policy callback after evaluating the critical function call.

Example 43 may include the subject matter of example 41, wherein detecting the critical function call comprises identifying a request for an indirect branch.

Example 44 may include the subject matter of example 41, wherein evaluating the critical function call comprises comparing the function call against a self-check policy.

Example 45 may include the subject matter of example 44, wherein the self-check policy comprises a white list of approved function calls.

Advantages of the present disclosure are readily apparent to those of skill in the art. Among the various advantages of the present disclosure include the following:

Aspects of the present disclosure can identify malware that may be hidden in obscure logical branches. The present disclosure also provides a way to discover and monitor malware for applications that are not intended for the computing device executing the code. The present disclosure contemplates countering evasion techniques against API hooks and other Sandbox specifics. Execution of the full logic path means that the malware detection can be performed independent of OS, hardware specifics, or installed software packages or versions.

While this specification contains many specific implementation details, these should not be construed as limitations on the scope of any disclosures or of what may be claimed, but rather as descriptions of features specific to particular embodiments of particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computer program product tangibly embodied on non-transient computer readable media, the computer program product comprising instructions operable when executed to:
   receive, from an execution profiler implemented at least partially in hardware, execution control of an indirect branch for a function call in an executable application;
   execute a callback to a self-check policy associated with the executable application for the indirect branch, wherein the self-check policy comprises at least one of a defense to a control-flow attack and a white list of authorized memory address locations for the indirect branch; and
   determine, by a self-check application module implemented at least partially in hardware, whether to execute the indirect branch based on the self-check policy associated with the executable application, by:
      evaluating one or more parameters for the indirect branch provided to the self-check application module by the execution profiler; and
      determining whether the one or more parameters are permitted for execution based on the self-check policy;
   wherein:
      the parameters comprise one or both of a source register location from which the indirect call originated or a destination register location for the indirect branch call; and
         the self-check application module determines whether the self-check policy permits an indirect branch from the source register to the destination register.

2. The computer program product of claim 1, wherein the indirect branch comprises one of a near indirect call, a near indirect jump, or a near return.

3. A system comprising:
   a processor implemented at least partially in hardware;
   a memory;
   an execution profiler module implemented at least partially in hardware to:
   receive, from an execution profiler implemented at least partially in hardware, execution control of an indirect branch for a function call in an executable application; and
   determine, by a self-check handler module, whether to execute the indirect branch based on a self-check policy associated with the executable application, wherein the self-check police comprises at least one of a defense to a control-flow attack and a white list of authorized memory address locations for the indirect branch, by:
      evaluating one or more parameters for the indirect branch provided to a self-check handler by the execution profiler; and
      determining whether the one or more parameters are permitted for execution based on the self-check policy;
   wherein:
      the parameters comprise one or both of a source register location from which the indirect call originated or a destination register location for the indirect call; and
      the self-check handler module determines whether the self-check policies permits an indirect branch from the source register to the destination register.

4. The system of claim 3, wherein the indirect branch comprises one of a near indirect call, a near indirect jump, or a near return.

5. A system for control flow protection, the system comprising:
   a processor implemented at least partially in hardware;
   a memory;
   an execution profiler module implemented at least partially in hardware to:
   assemble an execution profile of a executable application execution;
   monitor the executable application execution for an indirect branch instruction; and
   identify one or more parameters associated with the indirect branch instruction; and
   a self-check application module implemented at least partially in hardware to determine whether the indirect branch is permitted by performing a self-check using the parameters identified by the execution profiler module, by:
      evaluating one or more parameters for the indirect branch provided to a self-check handler by the execution profiler; and
      determining whether the one or more parameters are permitted for execution based on a self-check policy, wherein the self-check policy comprises at least one of a defense to a control-flow attack and a white list of authorized memory address locations for the indirect branch;
   wherein:
      the parameters comprise one or both of a source register location from which the indirect call originated or a destination register location for the indirect call; and
      the self-check application module determines whether the self-check policies permits an indirect branch from the source register to the destination register.

* * * * *